United States Patent
Haynes et al.

(10) Patent No.: US 8,116,030 B2
(45) Date of Patent: Feb. 14, 2012

(54) LOCATING FEATURE FOR MOUNTING A COMPONENT TO A BASE

(75) Inventors: Jonathan Scott Haynes, Petersham, MA (US); Freeman Hendrickson Fisher, Charlestown, MA (US)

(73) Assignee: Seagate Technology LLC, Cupertino, CA (US)

( * ) Notice: Subject to any disclaimer, the term of this patent is extended or adjusted under 35 U.S.C. 154(b) by 707 days.

(21) Appl. No.: 12/275,449

(22) Filed: Nov. 21, 2008

(65) Prior Publication Data

US 2010/0128396 A1 May 27, 2010

(51) Int. Cl.
*G11B 17/02* (2006.01)

(52) U.S. Cl. ............... 360/99.08; 360/99.12; 360/244.5

(58) Field of Classification Search ............... 360/99.08, 360/97.01, 97.02, 99.12, 244.5
See application file for complete search history.

(56) References Cited

U.S. PATENT DOCUMENTS

| | | |
|---|---|---|
| 4,754,353 A | 6/1988 | Levy |
| 4,945,435 A | 7/1990 | Boigenzahn et al. |
| 5,109,310 A | 4/1992 | Ohkjita et al. |
| 5,143,459 A | 9/1992 | Plutt |
| 5,754,372 A | 5/1998 | Ramsdell et al. |
| 5,801,901 A | 9/1998 | Bryan et al. |
| 5,850,318 A | 12/1998 | Dunfield et al. |
| 5,872,679 A | 2/1999 | Boigenzahn et al. |
| 5,999,373 A | 12/1999 | Allsup et al. |
| 6,128,165 A | 10/2000 | Baker et al. |
| 6,191,924 B1 | 2/2001 | Koester |
| 6,633,452 B2 | 10/2003 | Hirasaka et al. |
| 7,206,164 B2 * | 4/2007 | Hofland et al. ............ 360/97.01 |
| 7,271,978 B1 | 9/2007 | Santini et al. |
| 7,310,223 B2 | 12/2007 | Xu et al. |
| 7,322,094 B2 | 1/2008 | Kamigama et al. |
| 7,367,107 B1 | 5/2008 | Fruge et al. |
| 7,369,368 B1 | 5/2008 | Mohajerani |

OTHER PUBLICATIONS

Declaration of Jonathan Haynes, dated Apr. 2, 2009.

* cited by examiner

*Primary Examiner* — Huan Hoang

(74) *Attorney, Agent, or Firm* — Braden Katterheinrich

(57) ABSTRACT

The present disclosure provides an apparatus for mounting an object to a base. In one example, the apparatus includes a base and a protuberant feature extending from the base. The protuberant feature includes a datum surface sized to matingly engage a corresponding surface of an object to precisely position the object with respect to the base.

17 Claims, 4 Drawing Sheets

LOCATING FEATURE FOR MOUNTING A COMPONENT TO A BASE

BACKGROUND

The present disclosure relates generally to an apparatus having a locating feature for mounting an object or component to a base, and more specifically, but not by limitation, to a data storage device having a locating feature for mounting a component such as an actuator assembly to a base of the data storage device.

In a data storage system example, various components are mounted to a base deck or base plate of a data storage device. For example, fasteners (such as screws, bolts, rivets, and the like) can be utilized to mount components including, but not limited to, an actuator, a head stack assembly, a disc stack, a voice coil motor, a circuit board, and/or a cover, to a base of the data storage device. In many instances, it is essential that the component(s) are precisely located on the base using a mounting engagement having sufficient strength characteristics. For example, operational specifications of the data storage device often require that the mounting engagement between the components) and the base has sufficient rigidity, stiffness, and/or vibration damping characteristics while also enabling the component(s) to be accurately placed and maintained on the base.

The discussion above is merely provided for general background information and is not intended to be used as an aid in determining the scope of the claimed subject matter.

SUMMARY

The present disclosure provides an apparatus for mounting an object to a base. In one exemplary embodiment, an apparatus is provided and includes a base and a protuberant feature extending from the base. The protuberant feature includes a datum surface sized to matingly engage a corresponding surface of an object to precisely position the object with respect to the base.

In another exemplary embodiment, an apparatus is provided and includes an object that is mounted to a base. The base comprises a locating feature proximate the aperture. The locating feature defines an aperture in the base and comprises a raised portion that extends toward and at least partially engages a recess in the object to limit lateral movement of the object along the base. A fastener extends through the aperture and secures the object to the base.

In another exemplary embodiment, a base deck of a data storage device is provided. The base deck defines an aperture that is configured to receive a fastener for securing a bearing shaft of an actuator to the base deck. The base deck includes a raised locating stud feature disposed about the aperture and having an inner surface configured to receive the fastener within the aperture and an outer surface configured to contact a corresponding locating surface on the bearing shaft to constrain lateral movement of the actuator along the base deck.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

The present disclosure provides an apparatus having a locating feature for mounting a component or object to a base. The locating feature enables the component to be accurately and precisely placed on the base and provides a rigid mounting engagement between the base and the component. While the present disclosure describes various concepts with respect to mounting a component, such as an actuator assembly and the like, to a base (e.g., a base deck or base plate) of a data storage device, it is noted that the concepts described herein can also be utilized for other component mounting applications. For instance, the concepts described herein can be utilized to mount other types of components, such as a voice coil motor, a disc stack, a circuit board, and/or a cover in a data storage device. Further, in addition to the data storage device example, the concepts described herein can also be utilized to mount components in other types of environments such as, but not limited to, various types of computing devices, automotive environments, and/or manufacturing applications, to name a few.

Figure 1:
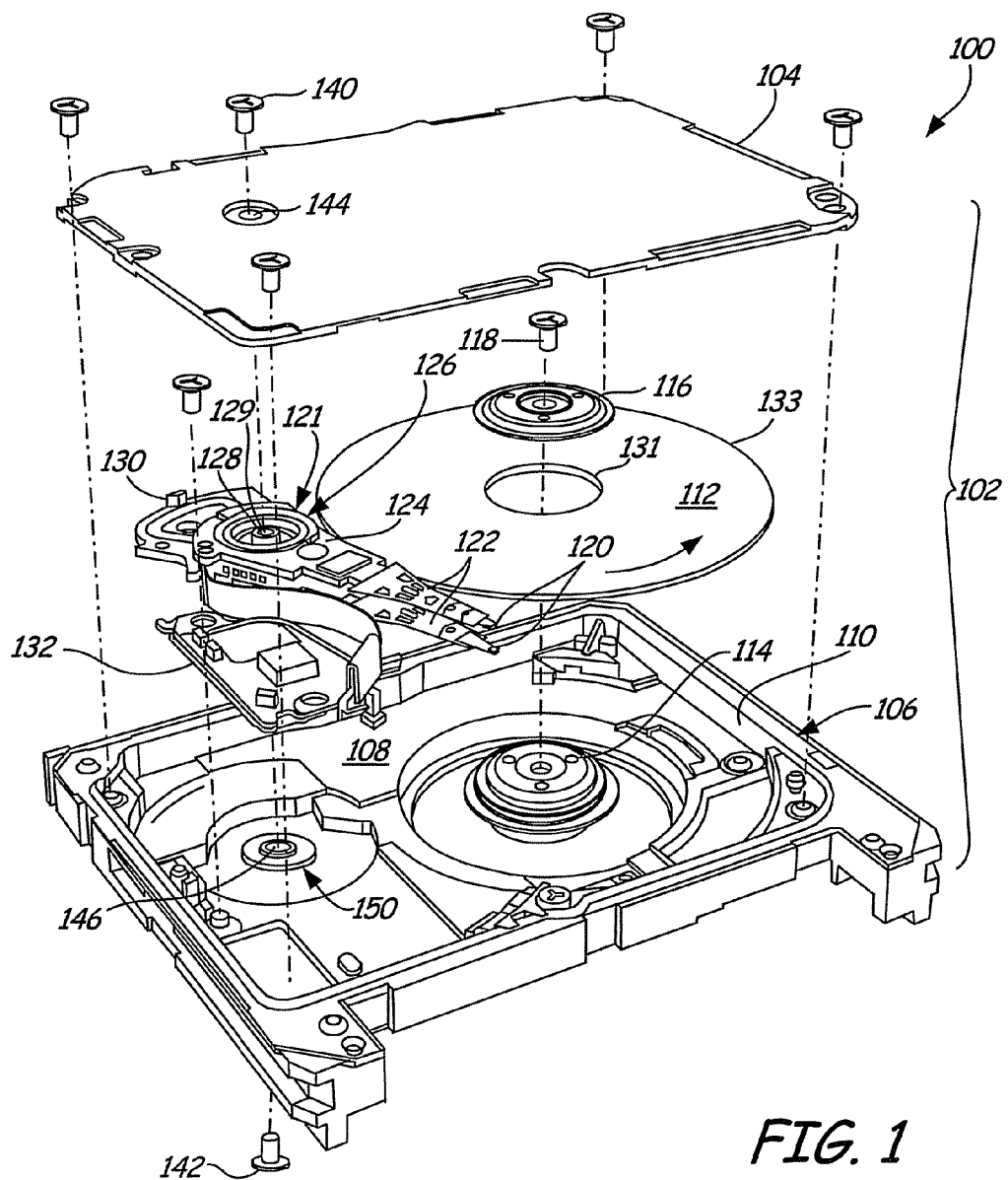
FIG. 1 is an exploded perspective view of one embodiment of a data storage device.

FIG. 1 is a perspective view of a data storage device 100 that includes a housing 102 having a cover 104 and a base 106. As shown, cover 104 attaches to base 106 to form an enclosure 108 enclosed by a perimeter wall 110 of base 106. The components of data storage device 100 are assembled to base 106 and are enclosed in enclosure 108 of housing 102.

As illustrated, data storage device 100 includes a disc or storage medium 112. Although FIG. 1 illustrates storage medium 112 as a single disc, those skilled in the art should understand that more than one disc can be used in data storage system 100. For instance, data storage device 100 can include a disc stack having a plurality of individual discs, which are mounted for co-rotation about an axis.

Storage medium 112 stores information in a plurality of data tracks which are further subdivided into data sectors. Storage medium 112 is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium 112. In embodiments where data storage device 100 includes a disc stack, a slider can be associated with each surface of the plurality of discs. The slider and transducers are often together referred to as a read/write head.

In the embodiment illustrated in FIG. 1, the data storage device 100 includes an assembly (i.e., a head stack assembly (HSA)) 121 having one or more sliders 120 that are positioned over a surface of a data storage medium. In the example shown in FIG. 1, sliders 120 are supported by suspension assemblies 122, which are, in turn, attached to track accessing arms 124 of an actuator mechanism 126. Actuator mechanism 126 is of the type known as a rotating moving coil actuator and includes a voice coil motor (VCM), shown generally at 130. Actuator mechanism 126 is rotated about a shaft 128 by VCM 130, which is controlled by servo control circuitry within internal circuit 132.

Head stack assembly (HSA) 121 rotates about an axis to position sliders 120 relative to desired data tracks, between a disc inner diameter 131 and a disc outer diameter 133. VCM 130 is driven by circuitry 132 based on signals generated by the transducers and a host computer (not shown). During operation, electronic circuitry 132 receives position information indicating a portion of medium 112 to be accessed. Electronic circuitry 132 receives the position information from an operator, from a host computer, or from another suitable controller. Based on the position information, electronic circuitry 132 provides a position signal to actuator mechanism 116. Once the transducers are appropriately positioned over a specified track on medium 112, electronic circuitry 132 then executes a desired read or write operation.

Head stack assembly (HSA) 121 is mounted to data storage device 100 using one or more fasteners. In the illustrated embodiment, HSA 121 is "bottom-mounted" within data storage device 100 and includes a fastener 142 that mounts the HSA 121 to the base 106. Fastener 142 passes through an aperture 146 formed in base 106 and is received by an aperture (not shown in FIG. 1) formed in a bottom of HSA 121. Further, in the illustrated embodiment a fastener 140 can also be provided for mounting HSA 121 within data storage device 100. Fastener 140 passes through an aperture 144 in cover 104 and is received by an aperture 129 of shaft 128. It is noted that FIG. 1 illustrates one exemplary embodiment for mounting HSA 121 within data storage device 100. Any suitable configuration for mounting HSA 121 within data storage device 100 can be utilized. For instance, more than or less than two fasteners can be utilized. Further, in one embodiment fasteners 140 and 142 are not utilized and HSA 121 can be mounted using other means.

Data storage device 100 can have any of a number of different sizes or "form factors". For example, data storage device 100 can be a 3.5 inch, or larger, form factor drive. In the illustrated embodiment, data storage device 100 has a form factor that is smaller than a 3.5 inch (e.g., 2.5 inch, 1.8 inch, 1.3 inch, 1 inch, 0.85 inch, etc.) form factor drive. In particular, the illustrated data storage device 100 has a 2.5 inch form factor.

One or more components of data storage device 100 (e.g., HSA 121, spindle assembly 114, a disc stack, a voice coil motor, etc.) require mounting engagement(s) with base 106 that accurately place and/or rigidly engage the components) to the base 106. For instance, various component attachment locations within data storage device 100 can require minimum fastener thread engagement and/or material strength. For example, with respect to mounting HSA 121 in data storage device 100, HSA 121 can require a minimum thread engagement with fasteners 140 and/or 142. Further, a portion of the base 106 proximate the area where HSA 121 is mounted (i.e., proximate aperture 146) can require particular material strength (i.e., material thickness) and/or structural integrity (i.e., vibration/shock resistance). These considerations are especially important in embodiments where the data storage device 100 has a small form factor. In particular, as the form factor of data storage device 100 decreases, the internal height within enclosure 102 becomes smaller, thus reducing the space within data storage device 100 for mounting components, which can further exacerbate any tolerance issues regarding the component attachment locations. Moreover, the internal height within enclosure 102 of data storage device 100 may further be limited by other factors, such as the presence of a printed circuit board (PCB) or other components proximate the data storage device.

In accordance with one embodiment, data storage device 100 includes one or more locating features formed on base 106 that enable components to be accurately mounted on base 106 and provide component attachment location(s) having sufficient material strength, integrity, and/or manufacturability characteristics (e.g., material flow). In the embodiment illustrated in FIG. 1, base 106 includes a locating feature 150 that is configured to locate head stack assembly 121 with respect to base 106. Locating feature 150 is positioned on the base 106 and is configured to receive and engage at least a portion of the head stack assembly 121 for positioning head stack assembly 121 with respect to other components of data storage device 100. For instance, locating feature 150 is configured to precisely position head stack assembly 121 with respect to storage medium 112. While FIG. 1 illustrates a single locating feature 150 for mounting head stack assembly 121 to data storage device 100, it is noted that locating features can also be used to mount other components of data storage device 100.

Figure 2:
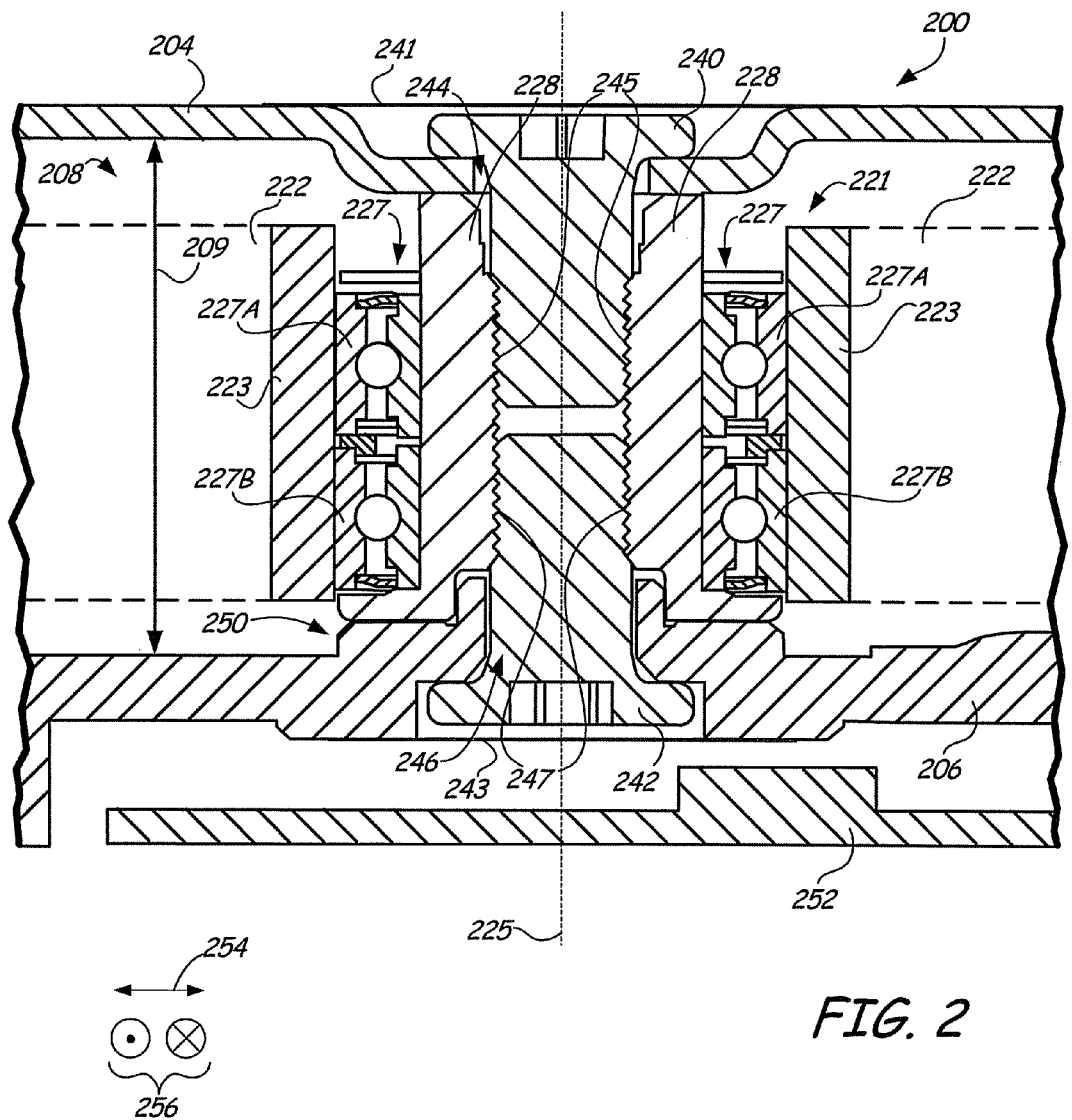
FIG. 2 is a cross-sectional view of a portion of a data storage device having a base including a locating feature for mounting a component to the base.
Figure 3:
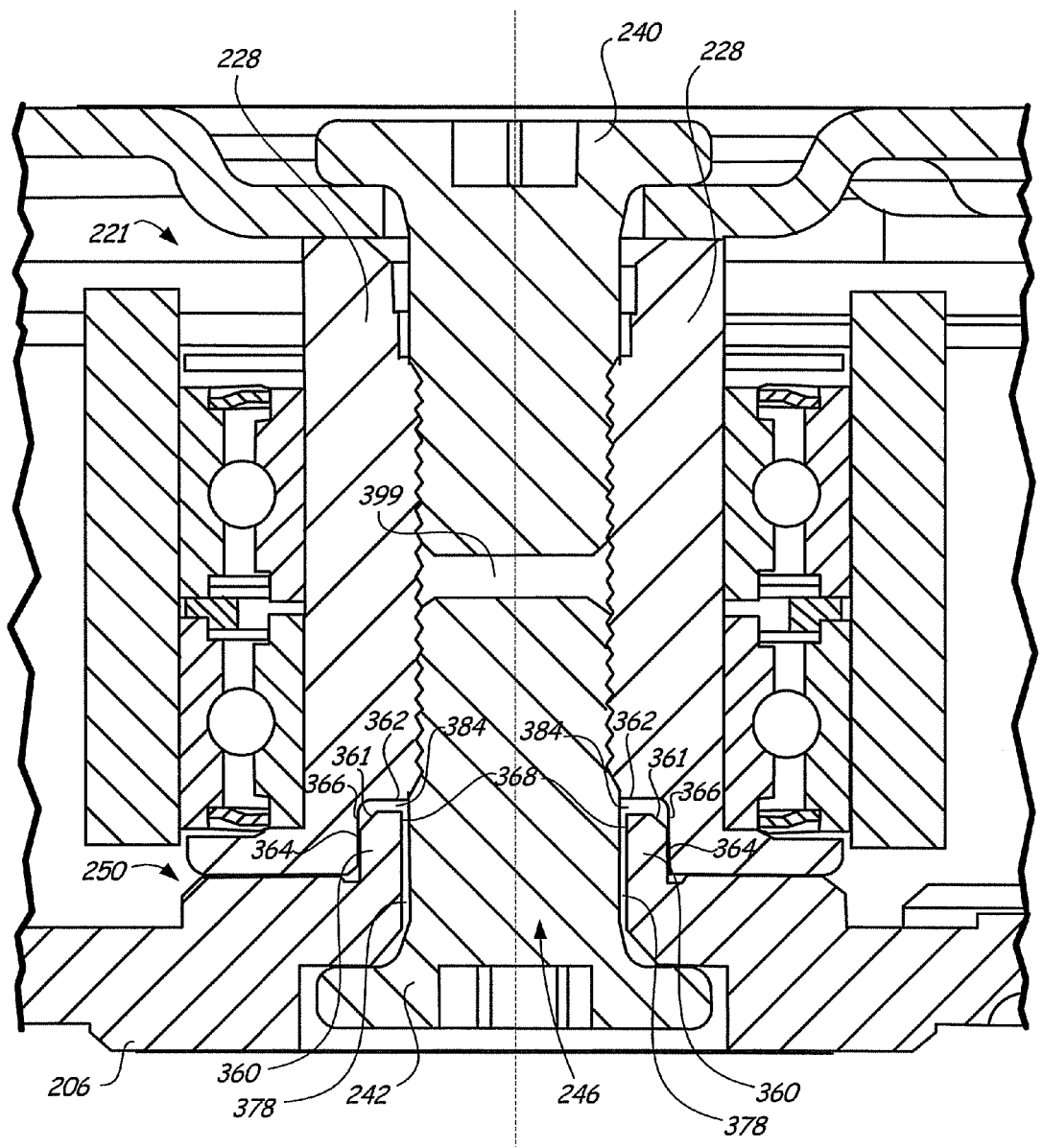
FIG. 3 is a cross-sectional view of a portion of the data storage device illustrated in FIG. 2.
Figure 4:
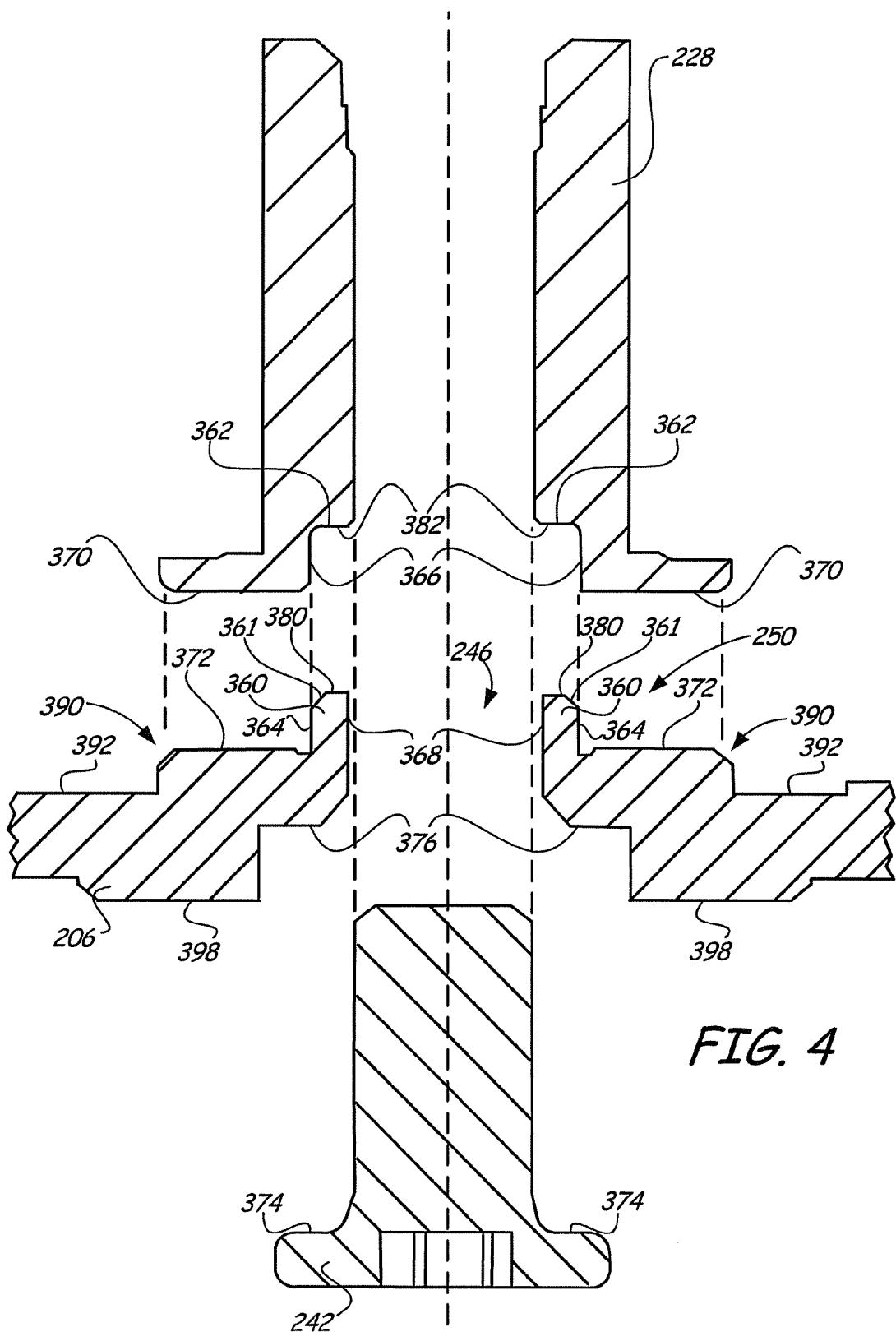
FIG. 4 is an exploded view illustrating the locating feature of FIG. 3.

FIGS. 2-4 illustrate embodiments of a locating feature for mounting components to a base of a data storage device. It is noted that while FIGS. 2-4 are described in the context of a data storage device, aspects of concepts described in the present specification can be utilized for mounting components in other types of applications. Further, while FIGS. 2-4 illustrate a locating feature for mounting an actuator assembly to a base, locating features can be utilized to mount other types of components in a data storage device.

FIG. 2 is a cross-sectional view of a portion 200 of a data storage device having a base 206 including a locating feature 250 for mounting an actuator assembly (illustratively a head stack assembly 221) to the base 206. The data storage device illustrated in FIG. 2 is similar to data storage device 100 illustrated in FIG. 1 and includes a cover 204 that meets with base 206 to form an enclosure 208. The enclosure 208 of the data storage device has an internal height 209 that is limited by the form factor of the data storage device. Moreover, the internal height 209 may further be limited by other factors, such as having components (such as a printed circuit board 252) that is mounted within or proximate the data storage device. In the example of FIG. 2, the PCB 252 is mounted proximate base 206 and includes circuitry components (e.g., chips) that face the base 206.

HSA 221 includes one or more components (generally illustrated at reference numeral 222) that are configured to move (e.g., rotate) about an axis 225. Examples of components 222 include, but are not limited to, track accessing arms 124 illustrated in FIG. 1. Components 222 are connected to a hub 223 that is coupled to a bearing shaft 228 by bearings 227. Bearings 227 are positioned between hub 223 and bearing shaft 228 and enable hub 223 to rotate about axis 225. In the illustrated embodiment, axis 225 comprises a center axis of bearing shaft 228.

Bearings 227 include a top bearing 227A and a bottom bearing 227B. However, it is noted that any suitable type and configuration of bearing assembly 227 can be utilized. For instance, bearing assembly 227 can include more than or less than two sets of bearings. Further, any suitable type of bearing, such as, but not limited to, ball or roller bearings, fluid bearings, hydrostatic bearings, and/or magnetic bearings, can be utilized. These are examples of configurations of bearing assembly 227 and are not intended to limit the scope of the concepts described herein.

As illustrated in FIG. 2, the first fastener 240 is positioned in an aperture 244 formed in the cover 204 and secures the bearing shaft 228 to the cover 204. Fastener 240 is illustratively a screw having threads 245 that engage corresponding threads on bearing shaft 228. The second fastener 242 is positioned in an aperture 246 formed in base 206 and secures the bearing shaft 228 to the base 206. Fastener 242 is illustratively a screw having threads 247 that engage corresponding threads on bearing shaft 228. Fastener 242 provides a "clamping" force between bearing shaft 228 and base 206. Further, the data storage device can also include seals 241 and 243 for sealing the apertures 244 and 246 thereby reducing or preventing contaminants, such as dust and other debris, from entering the enclosure 208.

As illustrated in FIG. 2, locating feature 250 comprises a structure for receiving and locating the actuator assembly 221 on base 206. In one embodiment, the locating feature 250 defines a datum surface for precisely locating the bearing shaft 228 of the actuator assembly 221 with respect to the base 206. In this manner, the datum surface allows an object (i.e., actuator assembly 221) to be accurately located and positioned (for example, within an allowed tolerance) with respect to other components (e.g., a head stack assembly, voice coil motor, etc.) in data storage device 200.

In one embodiment, the locating feature 250 constrains lateral movement of the actuator assembly 221 along a plane of the base 206 (for example, lateral movement in one or more directions represented by arrows 254 and 256). For example, the locating feature 250 can be sized to reduce, limit, and/or prevent lateral movement of the actuator assembly 221 along a plane of the base 206. For instance, the locating feature 250 and the bearing shaft 228 of the actuator assembly 221 can be location fit, transition fit, and/or press fit, to name a few.

FIGS. 3 and 4 illustrate locating feature 250 of FIG. 2 in detail. FIG. 3 is an enlarged cross-sectional view of a portion of the data storage device of FIG. 2. Further, FIG. 4 is an exploded view of a portion of FIG. 3.

As shown in FIGS. 3 and 4, locating feature 250 comprises a protuberant or raised portion 360 that extends from base 206 and is at least partially received by a recess 362 formed in bearing shaft 228. The protuberant feature 360 is formed integrally with the base 206 and at least partially (and fully in some embodiments) forms an annular ring that surrounds the fastener 242. Particularly, by "integrally" in these embodiments it is meant that the protuberant feature 360 and the base 206 are unitarily constructed. However, it is noted that protuberant feature 360 can be any suitable size and/or shape. For example, protuberant feature 360 can include flat, rounded, and/or angled surfaces and corners. In one embodiment, protuberant feature 360 includes a beveled or chamfered corner 361 that operates as a pilot or guide to aid in mounting bearing shaft 228 to base 206. Further, it is noted that the shape of the protuberant feature 360 can be round, polygonal, triangular, square, rectangular, etc. and can be symmetrical or asymmetrical.

The protuberant feature 360 can be sized to reduce, limit, and/or prevent lateral movement of the bearing shaft 228 along the base 206. In one example, the protuberant feature 360 is sized to allow slight movement (e.g., within a particular tolerance) of the bearing shaft 228 along the base 206 (for example, prior to the fastener 242 being used to secure the bearing shaft 228 to the base 206). In one example, the protuberant feature 360 is sized to rigidly constrain lateral movement of the bearing shaft 228 along the base 206. In the illustrated embodiment, the bearing shaft 228 and protuberant feature 360 are location fit wherein an outer peripheral surface 364 of the protuberant feature 360 defines a reference surface that is configured to pilot a corresponding locating surface 366 on the bearing shaft 228. In this manner, the protuberant feature 360 defines a datum surface for accurately locating bearing shaft 228 along a plane of the base 206. It is noted that in one embodiment, the bearing shaft 228 and protuberant feature 360 are transition fit. In one embodiment, the bearing shaft 228 and protuberant feature 360 are press fit.

An inner lateral surface 368 of the protuberant feature 360 defines the aperture 246 through which the fastener 242 passes to secure the bearing shaft 228 to the base 206. Fastener 242 is positioned in the aperture 246 and threadably engages bearing shaft 228. While fasteners 240 and 242 are illustrated as including threads that engage the bearing shaft 228, it is noted that in other embodiments fasteners 240 and 242 do not include threads. For instance, in one example fasteners 240 and/or 242 are friction-fitted to bearing shaft 228.

A surface 374 of the head of fastener 242 contacts a bottom surface 376 of base 206 (reference numbers 374 and 376 are illustrated in FIG. 4). The surface 376 of base 206 comprises a counterbore portion of the base 206. In particular, surface 376 is recessed from a bottom surface 398 of the base 206. Fastener 242 operates to compressingly engage a bottom surface 370 of bearing shaft 228 with a top surface 372 of base 206 (reference numbers 370 and 372 are illustrated in FIG. 4).

As illustrated in FIG. 3, locating feature 250 is configured to allow fasteners 240 and 242 to have adequate thread engagement with bearing shaft 228 while providing for adequate clearance 399 between the fasteners 240 and 242.

In the illustrated embodiment, the inner lateral surface 368 of the protuberant feature 360 that defines the aperture 246 has a diameter that is larger than the diameter of the portion of the fastener 242 passing therethrough such that a gap 378 is provided between protuberant feature 360 and fastener 242. In this manner, protuberant feature 360 is configured to receive fastener 242 but inner lateral surface 368 does not contact a surface of the fastener 242. However, it is noted that in other embodiments the inner lateral surface 368 of the protuberant feature 360 can be sized such that the surface 368 contacts and locates the fastener 242 within the aperture 246.

In the illustrated embodiment, a height of the protuberant feature 360 is sized such that a top surface 380 of the protuberant feature 360 is spaced apart from a top surface 382 of the recess 362 formed in the bearing shaft 228 (reference numerals 380 and 382 are illustrated in FIG. 4). In this manner, a gap 384 shown in FIG. 3 is provided between the protuberant feature 360 and the bearing shaft 228 when the bearing shaft 228 is engaged to the base 206. However, it is noted that in other embodiments the protuberant feature 360 can be sized such that the top surface 380 contacts surface 382 when the bearing shaft 228 is engaged to the base 206.

Referring to FIG. 4, in the illustrated embodiment a top surface of the base 206 includes a stepped region 390 having a plurality of raised surfaces. As illustrated, the stepped region 390 includes a first surface 392, the surface 372 that is configured to engage the bottom surface 370 of bearing shaft 228, and the top surface 380 of the protuberant feature 360. The surface 372 defines a plane that is displaced from a plane defined by first surface 392. Further, the top surface 380 of the protuberant feature 360 defines a plane that is displaced from the planes defined by surfaces 392 and 372.

Providing locating feature 250 on base 206 enables components, such as a head stack assembly 221, to be accurately and rigidly mounted on the base 206. Moreover, use of locating feature 250 provides an attachment location on base 206 that does not significantly reduce the material strength, integrity, tolerance, and/or manufacturability characteristics of the base 206. For instance, use of locating feature 250 does not require that a material thickness of the base 206 is reduced to a level that significantly weakens the base 206. Further, locating feature 250 can allow for adequate spacing between components, such as a clearance between fasteners used to mount the HSA 221 within the data storage device. This is especially advantageous in small form factor devices that have reduced internal heights for mounting components which could otherwise exacerbate component clearance and material strength/tolerance issues.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. An apparatus comprising:
   a base deck of a data storage system; and
   a protuberant feature extending from the base deck and, having an inner surface defining an aperture through the base deck, the protuberant feature is configured to receive a fastener for mounting a bearing shaft of an actuator assembly to the base deck and is configured to limit lateral movement of the bearing shaft along the base deck and concentrically locate the bearing shaft with respect to the aperture, the protuberant feature including a datum surface sized to matingly engage a corresponding surface of the bearing shaft to position the bearing shaft with respect to the base deck.

2. The apparatus of claim 1, wherein the protuberant feature is integrally formed with the base deck.

3. The apparatus of claim 1, wherein the protuberant feature defines an annular ring having an inner diameter surface that defines an aperture in the base deck and an outer diameter surface that defines the datum surface.

4. The apparatus of claim 3, wherein the inner and outer diameter surfaces of the annular ring have a cross section that is substantially parallel.

5. The apparatus of claim 1, wherein the bearing shaft is engaged to the base deck at a mounting region of the base deck, the mounting region comprising a plurality of raised portions, wherein the plurality of raised portions each include a top surface that faces the bearing shaft and define planes that are spaced apart and substantially parallel to each other.

6. The apparatus of claim 5, wherein a first of the plurality of raised portions comprises the protuberant feature and a second of the plurality of raised portions includes a top surface that operably engages the bearing shaft.

7. An apparatus comprising an object that is mounted to a base, the base comprising:
   a locating feature defining and at least partially circumscribing an aperture in the base, the locating feature including a raised portion that extends extending toward and at least partially engaging a recess in the object to limit lateral movement of the object along the base, the locating feature including an outer surface contacting a corresponding locating surface on the object to locate the object with respect to the aperture; and
   a fastener extending through the aperture and securing the object to the base.

8. The apparatus of claim 7, wherein the object comprises an actuator assembly that is engaged to the base at a mounting region, and wherein the outer surface of the locating feature is configured to concentrically locate the actuator assembly with the aperture.

9. The apparatus of claim 8, wherein the mounting region of the base includes a plurality of raised portions, the plurality of raised portions having top surfaces facing the bearing shaft that define planes that are spaced apart and substantially parallel to each other.

10. The apparatus of claim 9, wherein a first of the plurality of raised portions comprises the locating feature and a second of the plurality of raised portions includes a top surface that engages the bearing shaft.

11. The apparatus of claim 7, wherein the locating feature comprises an annular ring that is integrally formed with the base.

12. The apparatus of claim 7, wherein the object is at least one of a head stack assembly, a voice coil motor, and a disc stack associated with a data storage system.

13. An apparatus comprising a base and a protuberant feature extending from the base, wherein the protuberant feature includes a datum surface sized to matingly engage a corresponding surface of an object to position the object with respect to the base, the protuberant feature defining an annular ring having an inner diameter surface that defines an aperture in the base and an outer diameter surface that defines the datum surface.

14. The apparatus of claim 13, wherein the protuberant feature is integrally formed with the base.

15. The apparatus of claim 13, further comprising a fastener to secure the object to the base.

16. The apparatus of claim 13, further comprising multiple protuberant features.

17. The apparatus of claim 13, wherein the object is at least one of a head stack assembly, a voice coil motor, and a disc stack associated with a data storage system.

* * * * *